A. H. AUSTIN.
AUTOMATIC SCALE.
APPLICATION FILED OCT. 24, 1907.
917,519.
Patented Apr. 6, 1909.
3 SHEETS—SHEET 3.
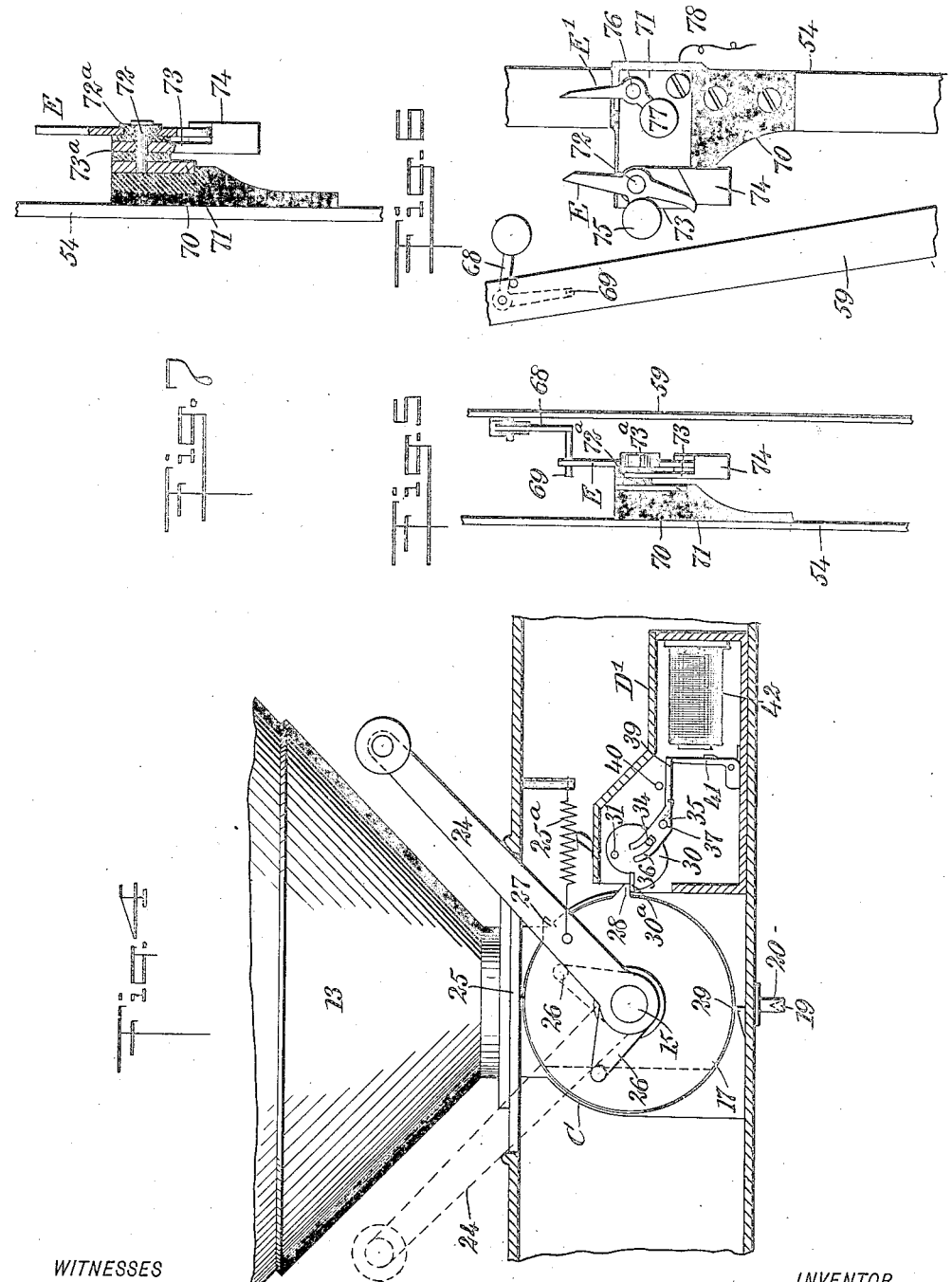
WITNESSES
INVENTOR
Anthony H. Austin
BY
ATTORNEYS

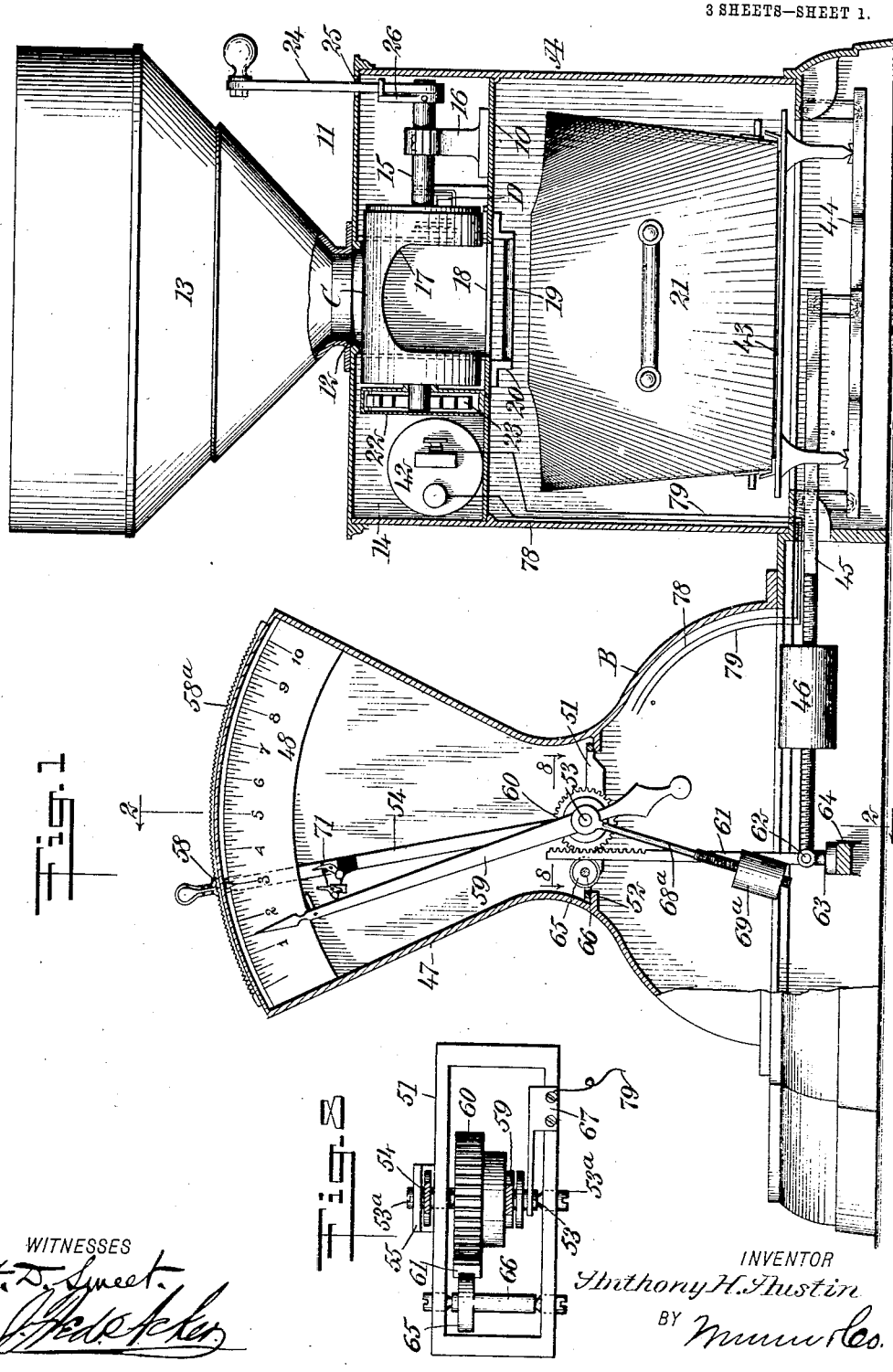

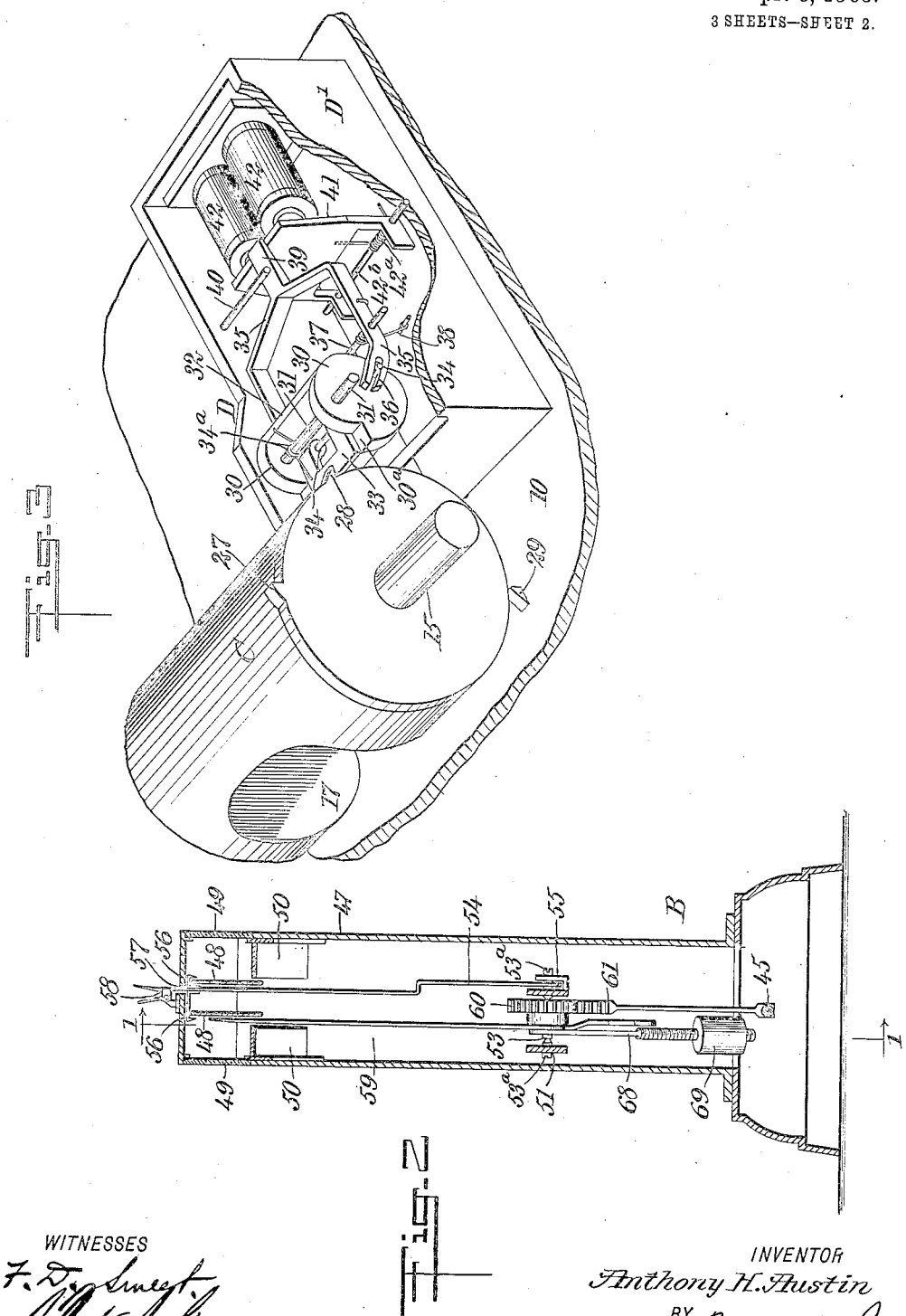

UNITED STATES PATENT OFFICE.

ANTHONY H. AUSTIN, OF NEW ROCHELLE, NEW YORK.

AUTOMATIC SCALE.

No. 917,519.  Specification of Letters Patent.  Patented April 6, 1909.

Application filed October 24, 1907. Serial No. 398,916.

*To all whom it may concern:*

Be it known that I, ANTHONY H. AUSTIN, a citizen of the United States, and a resident of New Rochelle, in the county of Westchester and State of New York, have invented a new and useful Improvement in Automatic Scales, of which the following is a full, clear, and exact description.

The purpose of the invention is to provide a scale, automatic in its action when set for feeding, the material flowing in suitable quantities from a suitably charged hopper or its equivalent, into a scale pan or like device.

It is also a purpose of the invention to so construct the device that when set to the required weight, and a feed mechanism interposed between the hopper and the scale pan has been adjusted, the material will pass freely from the hopper to the scale pan until the required weight has been obtained, whereupon the supply of material from the feed mechanism is automatically reduced until when a desired weight has been obtained the feed mechanism is automatically completely cut off, the controlling factor being electricity.

It is a further purpose of the invention to construct a scale of the character described that is simple, durable and economic, and so that its operation will be readily understood.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a sectional side elevation of the complete scale on the line 1—1 of Fig. 2; Fig. 2 is a vertical transverse section taken practically on the line 2—2 of Fig. 1; Fig. 3 is an enlarged detail perspective view of the feed mechanism; Fig. 4 is an enlarged detail sectional end view of parts of the feed mechanism; Figs. 5, 6, and 7, are detail views of parts of the pointer and setting arm, illustrating the contact, the views being drawn upon an enlarged scale; and Fig. 8 is a detail horizontal section taken practically on the line 8—8 of Fig. 1.

The scale is preferably in two sections, embodying a casing A for the feed mechanism, and a casing B for the indicating mechanism. The casing A may be of any desired shape, in the drawings it is shown of rectangular formation and is provided near its upper portion with a horizontal partition 10, and in the top 11 of the casing A, at or about its center, an opening 12 is made and at this opening 12 the lower end of a hopper 13, or the equivalent thereof, is secured, the said hopper or other receptacle used being adapted to hold the material to be weighed. The space between the partition 10 and the top 11 of the casing A constitutes an upper chamber 14, as is clearly shown in Fig. 1. In this chamber 14 the feeding mechanism to be hereinafter particularly described, is located.

Relatively to the feeding mechanism, a shaft 15 is journaled in suitable bearings 16 supported by the partition 10, and on this shaft 15 immediately below the opening 12 in the top of the casing and the corresponding outlet for the hopper 13, a feed cylinder C is secured on said shaft, and this feed cylinder C is provided with an opening 17 that extends through from one side to the other and through one of its peripheral portions, as is shown in full lines in Fig. 1, and in dotted lines in Fig. 4, so that while the opening 17 when the cylinder C is in receiving position admits of the passage through said cylinder of the material from the hopper, when the cylinder C is in its closed position, as is illustrated in Fig. 1, the solid peripheral portion of the said cylinder effectually closes the opening 12 at the top of the casing and the outlet hopper 13. Immediately below the opening 17 in the feed cylinder C, a corresponding opening 18 is made in the partition 10, as is also shown in Fig. 1, and just below this opening 18 in the lower compartment of the casing A, what I term a divide board or plate 19 is located, being supported by suitable brackets 20. This divide board or plate serves to direct the material that passes through the opening 17 in the cylinder C to opposite sides of the lower chamber in the casing A, and directs the said material into a scale pan 21 of any approved type, or any equivalent receptacle located in the said lower compartment of the casing.

The shaft 15 for the feed cylinder C is provided with a drum 22 at one of its ends, and in the said drum a spring 23 is coiled, secured to the said drum and to the said shaft, and the spring 23 tends to cause the cylinder C to turn in direction of its closing position. The shaft 15 is also provided at the end opposite that at which the drum 22 is located, with a crank handle 24 or its equivalent, that is loosely mounted upon the shaft, and adjacent to this crank handle 24 that passes out from the casing through a suitable slot 25 therein, a crank arm 26 is fixed to the shaft 15, and the horizontal member of this crank arm is adapted to be engaged by that portion of the crank handle 24 located in the chamber 14, as is also shown in Fig. 1. When the cylinder C is turned to its receiving position, or to a position to admit of the passage of material through its opening 17, the cylinder occupies the position shown in Fig. 4 and at that time the crank arm 26 will be at an angle to the crank handle 24, since the handle 24 when it is not in use is drawn and held at one end of its slot 25 by means of an attached spring 25$^a$, as is illustrated also in Fig. 4. In turning the cylinder from its closed position to its full open position, the crank handle 24 is turned until it has engagement with the horizontal member of the fixed crank arm 26 and has moved the cylinder the desired extent.

The cylinder C is provided at one end of its peripheral portion with two teeth, namely what I term an upper tooth 27 and a lower tooth 28, and when the tooth 28 is in engagement with a latch device D to be shortly described, the cylinder is held in full open or receiving position, and when the upper tooth 27 is in engagement with the said latch device D, the cylinder is held in such position that the material feeds but slowly through it, a portion of its opening 17 having been closed. The crank arm 26 will then be in the position shown in dotted lines in Fig. 4. When the feed cylinder C is fully closed, as is illustrated in Fig. 1, then the lower tooth 28 will engage with a tooth 29 that is located on the upper face of the partition 10, as is shown in Figs. 3 and 4.

The latch device D above referred to is located within an auxiliary casing D' placed in the chamber 14 in such manner that the latch device faces the aforesaid teeth 27 and 28. This latch device consists of opposing cheek pieces 30 that are eccentrically mounted upon a suitable spindle 31 journaled in the auxiliary casing D', and those portions of the cheek pieces 30 that face the cylinder C are provided with flat surfaces 30$^a$, and opposite these flat surfaces 30$^a$, and between the cheek pieces, a latch 33 is mounted upon a spindle 34 journaled in the said cheek pieces below and at the rear of the spindle 31, as is shown in Fig. 4, and the ends of the spindle 34 extend out beyond the said cheek pieces. The cheek pieces of the latch device are connected at what may be termed their rear portions by a longitudinal member 32, best shown in Fig. 3, and a spring 34$^a$ is coiled around the spindle 31 and has bearing against the latch section 33 of the latch device, holding it downward against the flat members 30$^a$ of the cheek pieces, but at the same time permitting the said latch member 33 to fly upward when the cylinder C is turned to bring the teeth 27 and 28 in engagement with the under face of said latch member.

A forked arm 35 is employed in connection with the aforesaid latch device, and the terminals of the said arm are upwardly inclined and are provided with slots 36 to receive the outwardly extending end portions of the spindle 34, as is shown best in Fig. 3, and a spindle 37 is passed through the forked member 35 at the rear of the latch device D, and a spring 38 is connected with this spindle and with the partition 10, and has bearing against the under portion of the forked member 35, tending to carry an extension 39 from the rear portion of said forked member, upward in direction of a pin 40 carried by the auxiliary casing D', but the latch device is temporarily located in position to retard the cylinder, by engagement with one of its teeth through the medium of an armature 41, that is energized by suitable magnets 42, the armature being held in the upright position shown particularly in Fig. 3, by means of springs 42$^a$ that are wound around the pivot pin 42$^b$ of the said armature and engage with the partition 10 and a side face of the armature. When the magnets 42 are energized they attract the armature, and the latch device D being eccentrically mounted, and the engaging tooth of the latch member 33 being made to bear down thereon through the action of the spring 23 in the barrel 22, as the armature is removed from engagement with the tongue or extension 39 of the forked member 35, the latch device moves downward, causing its forward or slotted ends 36 to move upward and at such time the cylinder is released and it is permitted to revolve to the extent of one of its teeth, but as soon as the circuit is broken, connected with the magnets, the said circuit is almost instantly restored, so that the spring controlling the forked member acts to carry it up and the armature then assumes its normal position, and the next upper tooth of the cylinder will be brought to a sustaining engagement with the latch member 33.

The scale pan 21 is located upon an auxiliary platform 43, that is supported upon the usual scale platform 44 located in the bottom of the casing A, and the said scale platform 44 has connected with it a scale beam 45 that extends into the base portion of the casing B for the indicating mechanism. This scale beam 45 is provided with the customary counterbalance 46. The upper portion 47 of the casing for the indicating mechanism is preferably made flaring and flat at its front and back, and at about the central portion of its upper face two plates 48 are located back to back, having figures and divisions produced thereon indicating pounds and the fractions thereof, and these indicating plates 48 are covered by transparent panels 49, but the interior of the casing B below the said indicating plates or transparent panels is concealed by means of horizontally depressed spaced cover plates 50 located within the said casing one at each side of the center, as is shown best in Fig. 2.

A skeleton frame 51 is horizontally supported on suitable brackets 52 within the casing B containing the indicating mechanism, as is best shown in Fig. 1, and a shaft 53 is mounted in suitable bearings 53ª transversely at or about the central portion of the said skeleton frame 51, as is shown in Fig. 8, and at the rear central portion of the said frame 51 a setting arm 54 is loosely mounted upon a bearing for the shaft 53 within a bracket 55, as is also best shown in Fig. 8, and the said setting arm 54 extends upward between the two indicating plates 48, as is shown in Fig. 2, and is provided at its upper portion within the casing B with indicating members 56 that travel along the central faces of the indicating plates 48, as is also shown in Fig. 2. The said setting arm 54 passes up through a slot in the upper face of the casing B, which slot is designated as 57, and at the upper or outer end of the said setting arm 54, a thumb latch 58 is provided that engages with a rack 58ª on the exterior upper surface or face of the casing B, which said upper surface or face of said casing is convexed, as is illustrated in Fig. 1.

A pointer 59 is secured to the said shaft 53 adjacent to its forward end, and this pointer extends up and has free movement across the front or central face of the forward indicating member 48, as is shown in Fig. 1. A pinion 60 is also secured to the aforesaid shaft 53, as is particularly illustrated in Fig. 8, and this pinion 60 is engaged by the teeth of a rack bar 61 that extends upward from and is pivotally attached to the inwardly extending end of the scale beam 45, as is shown in Fig. 1, but the rack bar 61 extends down below the scale arm 45 and terminates in a cushioned foot 63, that is adapted when the rack bar is in its lowest position to engage with a support 64 and prevent any jar being sustained by the scale beam 45, or the parts in connection with which the rack bar 61 operates. The rack bar 61 is guided in its movement by means of a roller 65, that engages with its back or plain longitudinal edge, the roller being mounted upon a suitable shaft 66 located within the frame 51, as is illustrated in Figs. 1 and 8. All of the bearings wherever it is possible are cone bearings, so that the parts of the device will operate with the least possible amount of friction, and by preference a brush 67 is secured to the frame 51, having bearing against the shaft 53, as is shown in Fig. 8.

The pointer 59 adjacent to its upper end, has an angular peripherally counterbalanced contact arm 68 fulcrumed upon its rear face, the horizontal member 69 whereof virtually constitutes the contact point for the said arm, as is illustrated in Fig. 5. On the front face of the setting arm 54, a block 70 of insulating material is secured in any suitable or approved manner, and against the outer face of the said block 70 a metal plate 71 is located, and from this plate adjacent to what may be termed its outer side edge, a pin 72 is forwardly projected. The plate 71 carries two pivotally mounted contact points E and E', adapted to be engaged one after the other by the contact terminal 69 of the contact arm 68 on the pointer 59, the outermost pivoted contact point E being the first engaged and then the inner one E'.

The contact E on the setting arm 54 is in the form of an arm or a finger, that is pivoted about centrally of its ends upon the said pin 72, and is insulated from said pin by means of a suitable washer 72ª, as is illustrated in Figs. 5 and 7. Back of the insulating washer 72ª a pendulum arm 73 is mounted on the said pin 72, as is shown in Figs. 5, 6, and 7, the lower portion 74 of which pendulum arm 73 is weighted and is constructed to form a shoulder, against which the lower end of the finger constituting the contact E is normally held by means of a weight 75, connected with said finger and extending therefrom at its pivoted portion. The pendulum arm 73 is separated from the plate 71 by means of a washer 73ª, of an insulating material. The inner contact E' is also in the form of a finger, and is pivoted by means of a suitable pin 76 extending from the plate 71, as is shown in Fig. 6, and is held normally in an upwardly extending vertical position by means of an applied counterbalance weight 77. The contact E' need not necessarily be pivoted, since it is engaged by the contact on the pointer 59 after the full supply of material has been delivered to the scale pan, and therefore its contact is permanent until the pointer reaches zero, and at such time the pointer is balanced by means of an arm 68ª, that extends down from the shaft 53 and is attached thereto, and is provided at its lower end with an adjustable weight 69ª, that corresponds to the customary weight applied to an ordinary scale beam, and when the pointer 59 is at zero the controlling or counterbalancing arm 68ª will occupy substantially a vertical position.

Wires 78 and 79 are carried in the customary manner from the magnets 42, and one wire is carried to the plate 71 on the setting arm 54, as is illustrated in Figs. 1 and 6, while the other wire 79 is carried to the brush 67 illustrated in Fig. 8.

In the general operation of the device, the handle 24 is carried from one end of the slot 25 to the other, whereupon it engages with the crank 26 on the shaft 15, and the cylinder C is rotated to bring the opening 17 therein in registry with the opening at the bottom of the hopper 13 and the opening 18 in the partition 10, the cylinder then occupying the position shown in Fig. 4. As the cylinder is thus revolved, the teeth 27 and 28 pass by the latch device D, but as soon as the cylinder has reached the position shown in Fig. 4, the lower tooth 28 will engage with the said latch device, and will be held in receiving position until the material received by the scale pan 21 acts upon the scale platform and beam 45, to bring the contact member 69 of the pointer 59 in engagement with the contact E carried by the setting arm 54. At such time the electric circuit will be closed, the magnets will be energized and the armature 41 will be withdrawn from supporting engagement with the forked member 35 of the latch device D, thereby permitting the tooth 28 to pass by the said latch device, but almost as soon as the tooth 28 has thus passed the contact between the member 69 of the pointer and the member E on the setting arm, the circuit will have become broken, and the spring controlling the armature will restore it to its normal position and the spring controlling the forked arm will carry the latter up to its normal position, thus locking the latch device so that it will prevent the passage of the upper tooth 27. When this upper tooth 27 engages with the latch device D, the opening in the cylinder is partially closed, so that the supply of material from the hopper to the scale pan is rendered quite slow, thus preventing a possibility of more material entering the scale pan than is desired, and also preventing the possibility of the operative parts of the device becoming strained or rendered unfit for use. The moment that sufficient material has been received in the scale pan 21 to carry the contact member 69 of the pointer 59 to an engagement with the contact member E' of the setting arm 54, the circuit will be again closed, the magnets energized, and the latch device is then rendered free to permit the cylinder to revolve until the lower tooth 28 engages with the fixed tooth 29 on the floor of the chamber 14, and at such time the cylinder will be held in the position shown in Fig. 1, wherein it is illustrated as closing the outlet from the hopper. It is obvious that the contact E' may be fixed, but it is pivoted in order that if by any possible means the pointer should be forced by it the pointer would not be strained. As soon as the handle 24 is released after having been operated it is returned to normal position by its connecting spring 25$^a$.

Having thus described my invention, I claim as new and desire to secure by Letters Patent,—

1. In an automatic scale, a container for material, a vessel adapted to receive material from the container, a scale mechanism including a scale platform adapted as a support for said vessel, a scale beam, an indicator plate, a pointer operated from the scale beam and adapted for movement over the indicator plate, and means by which the position of the scale beam and the pointer varies continuously between limits in accordance with variations in the weight of the material in the receiving vessel, a feed device having a passageway therein adapted to establish communication between the container and receiving vessel, and means controlled by the movement of the pointer for regulating the volume of material supplied through the feed device.

2. In an automatic scale, a container for material, a vessel adapted to receive material from the container, a scale mechanism having a platform adapted as a support for the receiving vessel, a scale beam, an indicator plate, a setting arm movable relative to the indicator plate, a pointer operated from the scale beam and adapted for movement over the indicator plate to and from the setting arm, means by which the position of the scale beam varies continuously in accordance with variations in the weight of the material in the receiving vessel, a feed device located between the container and the receiving vessel and adapted to receive material from the container and deliver it to the receiving vessel, means for moving the feed device from receiving and delivering position to closed position, means for holding the said feed device against movement when in the receiving and delivering position, and means for controlling the movement of said holding means, and comprising an electric circuit and contact points included in said circuit and carried by the said setting arm and pointer.

3. In an automatic scale, the combination with a container for material, a receiving vessel located beneath the container, an indicator plate, a scale mechanism adapted as a support for said vessel and provided with a pointer adapted for movement over the indicator plate, and means by which the position of the pointer varies between limits in accordance with variations in the weight of the material in the receiving vessel, of a feed cylinder having a passageway adapted to establish communication between the container and the receiving vessel, a latch device for locking the feed cylinder in predetermined positions, means adapted to move the feed cylinder in direction of its closing position, a setting arm movable relative to the indicator plate and provided with a plurality of contact points, a contact point on the pointer adapted to successively engage the contact points of the setting arm, an electric circuit closed when the contact point on the pointer engages either of the contacts of the setting arm, and means for normally holding said latch device in locking position, the said means being actuated to release said latch device when the circuit is closed.

4. In an automatic scale, a container for material, a vessel adapted to receive material from the container a scale mechanism adapted as a support for said vessel, a feed device for establishing communication between the container and receiving vessel, and comprising a cylinder mounted to turn and provided with a passageway, manually controlled means for moving the cylinder to full receiving and discharging position, a tension device controlling the movement of the cylinder in the opposite direction, projections from the cylinder, a latch device for engagement with the said projections to hold the cylinder in predetermined positions, and means controlled by the scale mechanism for controlling the movement of the latch device.

5. In an automatic scale, a container for material, a vessel adapted to receive material from the container, a scale mechanism arranged to support the receiving vessel, a feed device comprising a cylinder having a passageway for establishing communication between the container and the receiving vessel, means tending to move the cylinder from receiving and discharging position to closed position, a plurality of spaced teeth on the peripheral portion of the cylinder, an eccentrically mounted latch device for engagement with the said teeth to hold the cylinder in predetermined positions, and means for normally holding the latch device in locking position, the said means being controlled by the scale mechanism.

6. In an automatic scale, the combination with a container, a receiving vessel beneath it, a scale platform for the receiving vessel, an indicating plate, a setting arm adapted for free movement over said plate, and a pointer also adapted for movement over the plate controlled by the movement of the scale platform, of a feed device consisting of a cylinder mounted to revolve between the container and the receiving vessel, the cylinder having an opening therethrough, a tension device controlling the movement of the cylinder in one direction, means for manually controlling the movement of the cylinder in the opposite direction, a latch device, projections from the cylinder adapted for engagement with the latch device, an armature normally holding the latch device in locking position, magnets for controlling the movement of the armature, contact points carried by the setting arm, and a contact point carried by the pointer, both of which are in circuit connection with the magnets, whereby when a contact point on the pointer engages with one upon the setting arm the circuit to the magnets is closed, being open when such contact is released.

7. In an automatic scale, the combination with a container, a receiving vessel located beneath the container, a scale platform serving as a support for the receiving vessel, the said scale platform being provided with a scale beam, an indicator plate, a setting arm free for movement relatively to the indicator plate, and a pointer operated from the said scale beam, adapted for movement over the indicator plate to and from the setting arm, of a feed device located between the container and said receiving vessel, consisting of a cylinder mounted to revolve, spring controlled in one direction and manually operated in the opposite direction, projections from the cylinder, a locking latch device for engagement with the said projections from the cylinder to hold the cylinder in predetermined positions, magnets, an armature therefor which is the controlling support for the said latch device, a contact point carried by the pointer, and a series of contact points carried by the setting arm adapted to be engaged one after the other by the contact point on the pointer, and an electric circuit between the said magnets and the said contact points.

8. In an automatic scale, a container for material, a vessel adapted to receive material from the container, a scale platform for the receiving vessel, an indicating plate, a pointer adapted for movement over the indicating plate and provided with a counterbalancing arm, the said pointer being controlled by the movement of the scale platform, a feed device comprising a cylinder mounted to turn and having a passageway therein adapted to establish communication between the container and the receiving vessel, means for turning the cylinder in one direction, a latch device for the cylinder, and means controlled by the movement of the pointer for controlling the movement of the latch device.

In testimony whereof I have signed my name to this specification in the presence of two subscribing witnesses.

ANTHONY H. AUSTIN.

Witnesses:
J. FRED. ACKER,
JOHN P. DAVIS.